(Model.)

V. BÉLANGER.
SPROCKET WHEEL.

No. 504,486. Patented Sept. 5, 1893.

WITNESSES:
A. H. Abell.
Parker Davis.

INVENTOR:
V. Bélanger
by Wright Brown Horsely
Attys.

UNITED STATES PATENT OFFICE.

VICTOR BÉLANGER, OF BOSTON, ASSIGNOR OF ONE-HALF TO JOSIAH QUINCY, OF QUINCY, MASSACHUSETTS.

SPROCKET-WHEEL.

SPECIFICATION forming part of Letters Patent No. 504,486, dated September 5, 1893.

Application filed April 20, 1893. Serial No. 471,144. (Model.)

*To all whom it may concern:*

Be it known that I, VICTOR BÉLANGER, of Boston, in the county of Suffolk and State of Massachusetts, have invented certain new and useful Improvements in Sprocket-Wheels, of which the following is a specification.

This invention relates to an improvement in sprocket-wheels, and has in view the provision of a sprocket-wheel which will bring about a more efficient transmission of power, and consequent increase in speed with a given application of power. In an ordinary sprocket-wheel having rigid teeth, the teeth are spaced the same distance apart as the corresponding bearing-points of the chain, and in action the chain is in operative engagement with a plurality of teeth of the wheel. The effect of such engagement of the chain with the teeth of the wheel is to produce a very great strain on the bearings of the wheel and a large amount of friction in consequence. It is obvious that the transmission of power is most effectively accomplished through the engagement of the chain with a single tooth while it is substantially in a diametrical line of the wheel which is at right angles to the stretch of chain extending tangentially from the wheel. Obviously, if the friction on the bearings before mentioned is overcome, the same power can be applied more effectively.

It is therefore the chief object of my invention to so construct a sprocket-wheel that in action only that tooth which is substantially in a diametrical line of the wheel at right angles to the stretch of chain shall be in operative engagement with the chain, the remaining teeth being allowed limited play in the links of the chain.

To this end, the invention may be said to consist essentially in a sprocket-wheel having pivoted teeth, free to recede from a position of operative engagement with the chain, and spaced in closer proximity than the corresponding engaging points of the chain.

The invention also consists in certain features of construction and arrangements of parts to be fully described hereinafter and pointed out in the claims.

The accompanying drawings illustrate a construction by which the invention may be carried out.

Figure 1:
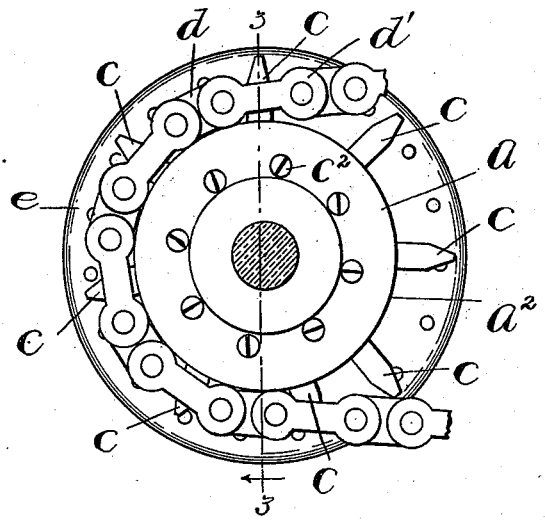
Figure 2:
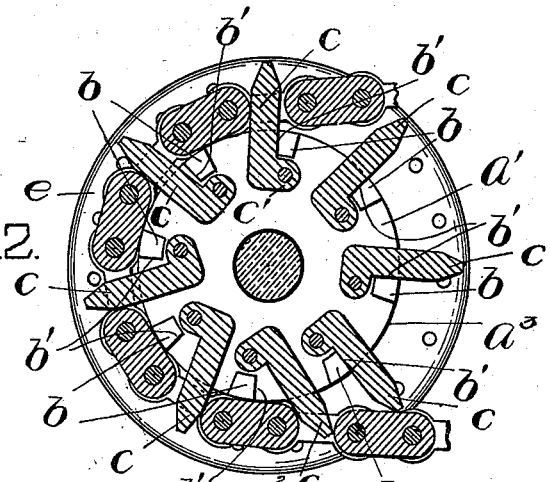

Figure 1 shows a side elevation of a sprocket-wheel constructed in accordance with my invention. Fig. 2 shows one side of the wheel removed and the chain and teeth in section. Fig. 3 shows a cross-section of the wheel.

The same letters of reference indicate the same parts in all the figures.

In the construction illustrated in the drawings, the circular body-portion or what may be termed the disk of the wheel is composed of a pair of circular plates $a$ and $a'$, of exactly the same size, so that, when their centers are coincident, their peripheries $a^2 a^3$ are flush. Each of the plates $a$ and $a'$ is provided on one side with a series of equidistant lugs $b$ at its periphery and flush therewith. The two plates are placed together, with the lugs of one abutting those of the other, and the plates are thereby held apart, so as to provide space between them. Each pair of abutting lugs $b$ forms a shoulder $b'$, which is approximately radial with respect to the wheel. Each tooth of the wheel is a separate piece, and its engaging portion $c$, which projects from the periphery of the wheel-disk, has much the same shape as the tooth of an ordinary sprocket-wheel. A tooth has position in each of the spaces which occur between the lugs $b$, and is pivoted at its inner end, at such a point that it may squarely abut the shoulder $b'$ at the end of the space in which it is confined, and hence, when abutting this shoulder, its end is projected as far as possible from the center of the wheel. In the present instance, the lugs $b$ do not extend to the center of the wheel, and the teeth are formed with lateral ears $c'$, which take behind the lugs and receive the pivots. As here shown, the pivots consist of screws $c^2$, passed through both plates $a$ and $a'$, and thus serving to secure said plates together. This particular construction of teeth and the manner of pivoting the same, while not essential to the invention, will be found of advantage, as, by carrying the pivot of each tooth forward of the radial shoulder which such tooth abuts in its operative position, the tooth is permitted to move farther inward toward the center of the wheel. As already inferred, the position of operative engagement of a tooth of the wheel is that in which it abuts the radial shoulder at the end of the space in which said tooth is confined. The teeth are spaced nearer together than the corresponding bearing-points of the chain; that is, when the teeth are in their operative position, bearing against the radial shoulders, their points of engagement with the chain are nearer together than the corresponding engaging points of the chain. This is best illustrated in Fig. 2, where the chain is represented as driving the sprocket-wheel. The chain is of ordinary construction, and consists of blocks $d$, connected by links $d'$, so as to have a space between each two blocks with a link $d'$ at each side thereof. It will be observed that the top tooth is abutting the shoulder $b'$ at the forward end of the space in which said tooth is confined, and that one of the blocks $d$ of the chain is bearing against said tooth toward the said shoulder. It will also be observed that this tooth is substantially in a diametrical line at right angles to the tangential stretch of the chain, and hence the most direct and effective transmission of power from the chain to the wheel is secured at this point. The next following block of the chain will not be bearing the tooth in front of it against the shoulder $b'$ in front of said tooth, for the reason already stated, that the bearing-points of the chain are a greater distance apart than the bearing-points of the teeth when the latter are in their operative positions against the radial shoulder. Hence the tooth is free to play in the space between the blocks of the chain. The same thing is true of all the other teeth which are interlocked with the chain. It will now be seen that the bearings of the wheel are relieved of the strain to which they are subjected by the engagement of a chain with a plurality of the rigid teeth of an ordinary sprocket-wheel, and only a single tooth is in operative engagement with the chain at a time. The combined effect of gravity and centrifugal force insures the engagement of each tooth with the chain. This engagement takes place on the lower side, as illustrated in Fig. 2, the teeth consecutively encountering the blocks of the chain, and being projected into the spaces between said blocks. As the chain leaves a tooth, it draws the following tooth to its operative position against a radial shoulder, and the chain remains in engagement with one tooth until it draws the next tooth to operative position, so that no lost motion occurs. The chain is supported directly and at all times on the peripheral surfaces $a^2$ $a^3$ of the wheel, and the movements of the teeth on their pivots do not affect the pitch of the chain. The teeth project through the chain, and have engagement only with the ends of the blocks thereof. By reason of the teeth being spaced nearer together than the engaging-points of the chain, the disk may be provided with the same number of teeth as a sprocket-wheel with rigid teeth, and be of smaller circumference than the latter, while the same chain may be used as with such rigid wheel.

Figure 3:
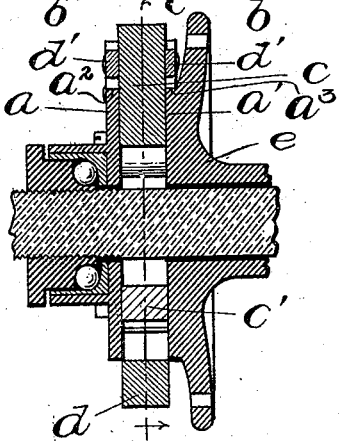

A sprocket-wheel of the construction described is of special advantage in bicycle-gear, and in the manufacture one of the plates forming the disk of the sprocket-wheel may be made integral with the hub $e$ of the bicycle-wheel to which the sprocket is applied, as shown in Fig. 3.

It is evident that the invention may be embodied in different form from that in which I have here shown it, and hence it is to be understood that I do not limit myself to this particular form in which I have chosen to illustrate it.

Having thus described my invention, what I claim as new, and desire to secure by Letters Patent, is—

1. A sprocket-wheel having pivoted teeth and constructed to permit limited play of said teeth, in combination with a chain bearing on the periphery of the wheel and having its points of bearing against the teeth a greater distance apart than the corresponding bearing-points of the teeth in their operative position at the limit of their pivotal movement in one direction.

2. A sprocket-wheel having pivoted teeth and rigid shoulders which limit the movement of said teeth, in combination with a chain whose points of bearing against the teeth are a greater distance apart than the corresponding points of the teeth in their operative position abutting the radial shoulders.

3. A sprocket wheel comprising in its construction a circular body portion or disk having a periphery adapted to support a chain, and angular teeth pivoted within the periphery of the disk and free to play in the chain while the latter bears on the periphery of the disk.

In testimony whereof I have signed my name to this specification, in the presence of two subscribing witnesses, this 13th day of April, A. D. 1893.

VICTOR BÉLANGER.

Witnesses:
ARTHUR W. CROSSLEY,
F. PARKER DAVIS.